United States Patent [19]
Nakamura et al.

[11] Patent Number: 5,475,395
[45] Date of Patent: Dec. 12, 1995

[54] REFLECTING MIRROR-EQUIPPED GPS RECEIVING ANTENNA APPARATUS

[75] Inventors: Yutaka Nakamura; Kazunori Miyahara, both of Atsugi, Japan

[73] Assignee: Sokkisha Co., Ltd., Tokyo, Japan

[21] Appl. No.: 306,733

[22] Filed: Sep. 15, 1994

Related U.S. Application Data

[63] Continuation-in-part of Ser. No. 19,343, Feb. 18, 1993, abandoned, which is a continuation of Ser. No. 723,685, Mar. 6, 1991, abandoned.

[30] Foreign Application Priority Data

Mar. 7, 1990 [JP] Japan .................. 2-22192 U

[51] Int. Cl.$^6$ .................................... H01Q 1/22
[52] U.S. Cl. ................. 343/720; 343/757; 343/882
[58] Field of Search ............ 343/700 MS, 757, 343/758, 761, 882, 703, 765, 766, 725, 729, 720; 342/56, 357; 356/18; H01Q 1/12, 1/22

[56] References Cited

U.S. PATENT DOCUMENTS

| | | | |
|---|---|---|---|
| 2,571,129 | 10/1951 | Hansen | 343/766 |
| 2,623,999 | 12/1952 | Kuhkowski | 343/766 |
| 2,659,075 | 11/1953 | Collins et al. | 343/765 |
| 4,311,382 | 1/1982 | Buckley et al. | 356/5 |

FOREIGN PATENT DOCUMENTS

| | | | |
|---|---|---|---|
| WO90/00719 | 1/1990 | Germany. | |
| 140802 | 6/1989 | Japan | 343/700 MS |
| WO90/00718 | 1/1990 | Japan. | |

OTHER PUBLICATIONS

Zetsche, Electronische Entfernungsmessung (EDM), Stuttgart Germany, 1979, pp. 174–177.

*Primary Examiner*—Michael C. Wimer
*Attorney, Agent, or Firm*—Armstrong, Westerman, Hattori, McLeland & Naughton

[57] ABSTRACT

A reflecting mirror-equipped GPS receiving antenna apparatus comprises a reflecting mirror and a microstrip type of antenna for receiving radio waves transmitted from GPS satellites. The reflecting mirror is supported by a base member so as to be swingable about a horizontal axis as well as rotatable about a first vertical axis. The antenna is supported above the reflecting mirror so as to be rotatable about a second vertical axis which is coaxial with the first vertical axis.

16 Claims, 2 Drawing Sheets

FIG. 1 FIG. 2
FIG. 3 FIG. 4
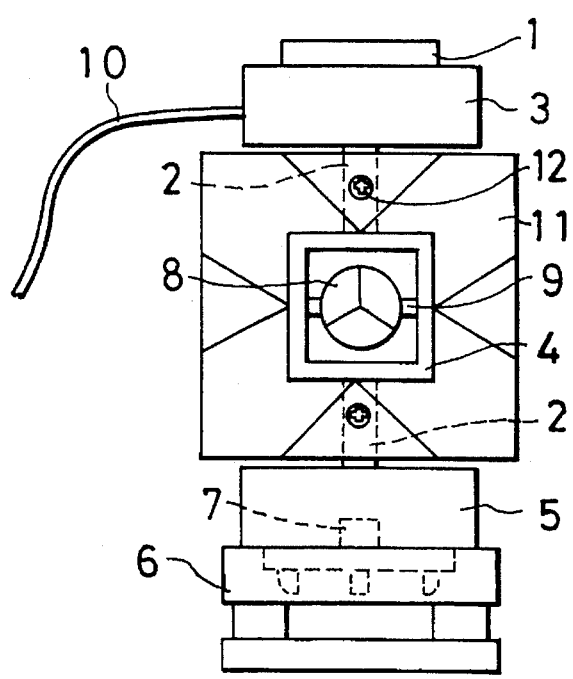
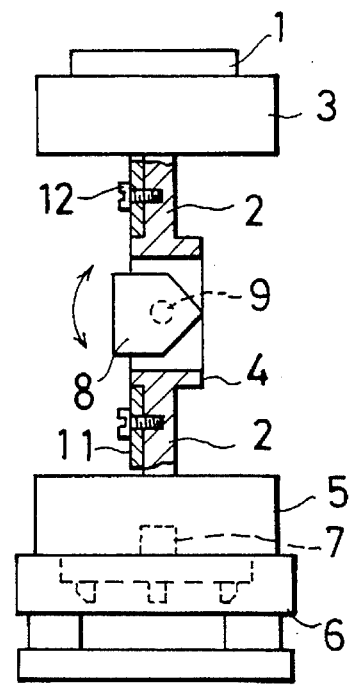
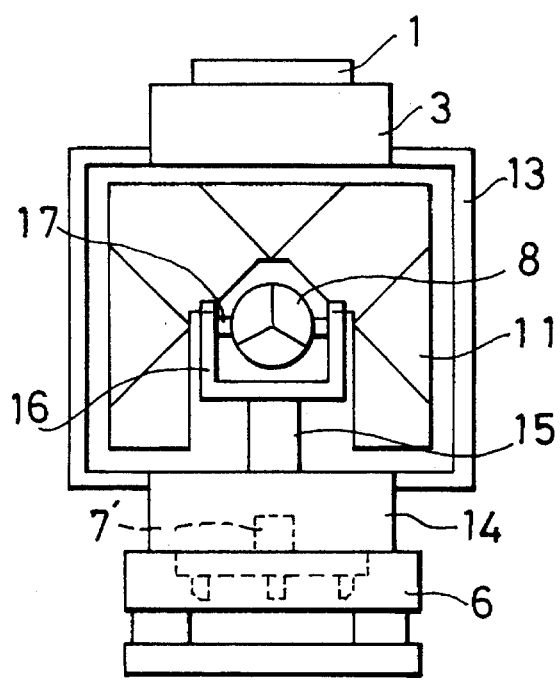
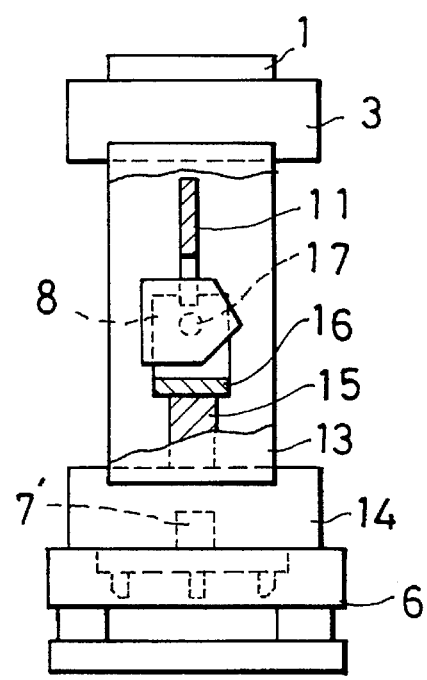

5,475,395

REFLECTING MIRROR-EQUIPPED GPS RECEIVING ANTENNA APPARATUS

This application is a continuation-in-part application Ser. No. 08/019,343 filed Feb. 18, 1993, now abandoned, which is a continuation of application Ser. No. 07/723,685 filed Mar. 6, 1991, now abandoned.

BACKGROUND OF THE INVENTION

This invention relates to a reflecting mirror-equipped GPS (Global Positioning System) receiving antenna apparatus, i.e., an antenna apparatus which receives radio waves transmitted from GPS satellites and which is equipped with a reflecting mirror for use in a conventional electronic distance meter (EDM) (tachymeter) or a total station.

Conventionally there is known a GPS interferometer measuring method in which the radio waves transmitted from GPS satellites are received by microstrip type of antennas disposed at two distant points, coordinate values at these two points (i.e., coordinate values with the earth's center as an origin) are obtained, and the distance between the two points is calculated from these values. An antenna apparatus to be used in this measurement comprises an antenna mounted on a tripod and a receiver connected to the antenna. The signals received by the antenna are calculated by the receiver, thereby indicating the coordinate values of the point.

The above-described antenna apparatus is equipped only with a function of receiving the radio waves from the GPS satellites. When the radio waves are prevented by a building or the like from reaching the antenna, they cannot be received by the antenna. Then, in case the measurement is carried out by an electronic distance meter or a total station by making the position at which the antenna is set as a survey point, the antenna apparatus must be removed to place therein a reflecting mirror apparatus instead. Consequently, the measurement with the conventional antenna apparatus is time-consuming and it cannot be done quickly.

OBJECT AND SUMMARY OF THE INVENTION

This invention has an object of providing an antenna apparatus which can solve the above-described problem associated with the conventional antenna apparatus.

In order to attain the above-described object, this invention is a reflecting mirror-equipped GPS receiving antenna apparatus comprising a reflecting mirror which reflects light from a total station which is provided with a tachymeter (electronic distance and angle measuring means) and a microstrip type of antenna for receiving radio waves transmitted from GPS satellites, the reflecting mirror being supported by a base member so as to be swingable about a horizontal axis as well as rotatable about a first vertical axis, the antenna being supported by the base member above the reflecting mirror so as to be rotatable about a second vertical axis which is coaxial with the first vertical shaft.

In this invention, the reflecting mirror can be swung below the microstrip type of antenna independently thereof about the horizontal axis. The reflecting mirror can also be rotated about the first vertical axis to change its direction, thereby causing it to be positioned right opposite the electronic distance meter or the total station which is provided with a means for electronic distance and angle measuring.

BRIEF DESCRIPTION OF THE DRAWINGS

The above and other objects and the attendant advantages of this invention will become readily apparent by reference to the following detailed description when considered in conjunction with the accompanying drawings wherein:

FIG. 1 is a front view of a first embodiment of this invention;

FIG. 2 is a side view thereof, partially shown in section;

FIG. 3 is a front view of a second embodiment of this invention;

FIG. 4 is a side view thereof, partially shown in section; and

DETAILED DESCRIPTION OF THE INVENTION

Figure 5:
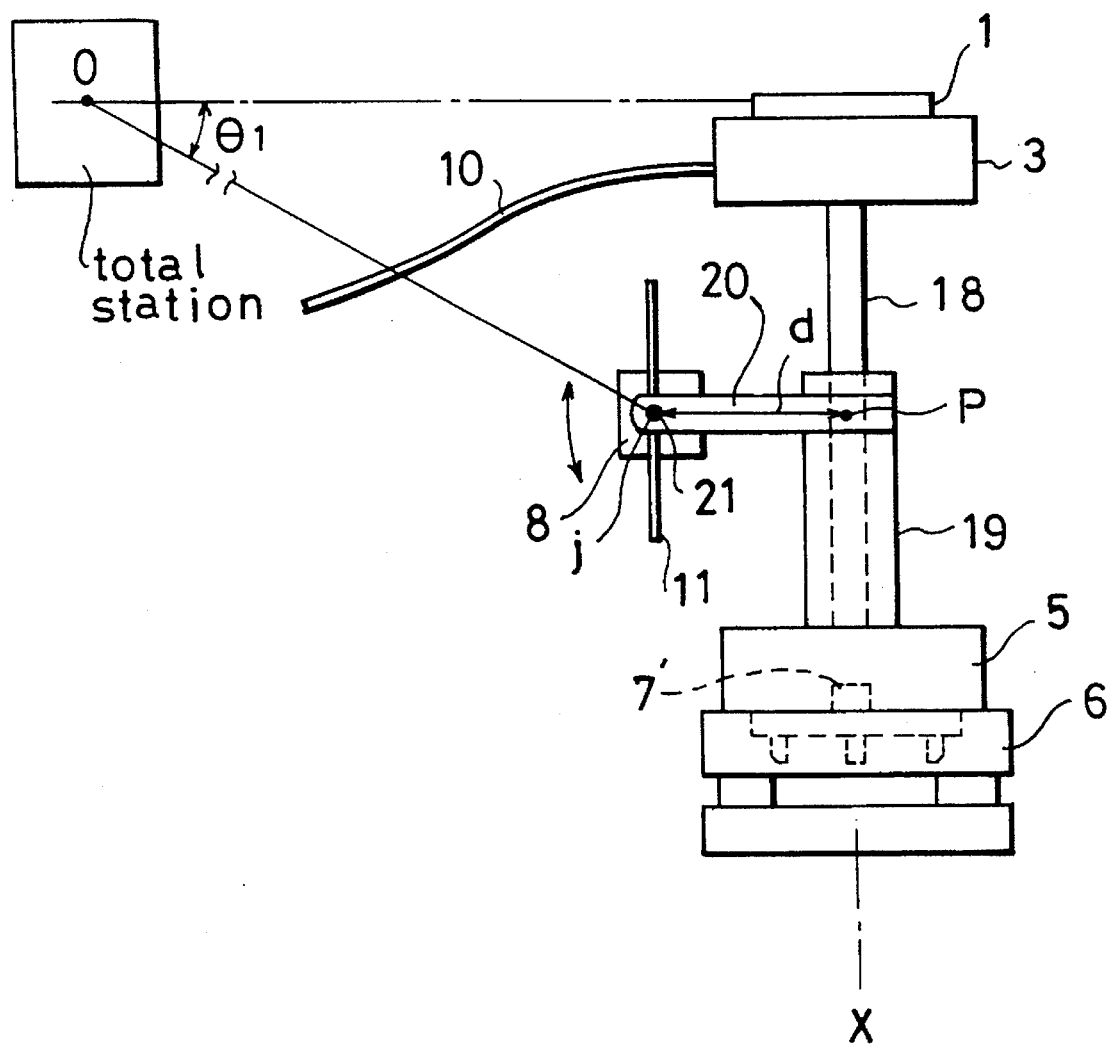
FIG. 5 is a side view of a third embodiment of this invention.

A description is made about embodying examples of this invention with reference to the drawings.

FIGS. 1 and 2 show a first embodiment of this invention.

A microstrip type of antenna 1 of disc shape for the GPS is mounted on a housing or a case 3 containing therein a preamplifier, the housing 3 being supported at an upper end of a second vertical supporting body 2, so as to be rotatable thereabout. The second vertical supporting body 2 has a frame 4 of square-tube shape in its intermediate position. A bottom piece 5 which is fixed to a bottom end of the second vertical supporting body 2 is rotatably supported by a first vertical supporting body 7 which is provided on a base member 6 at a connecting portion between the bottom piece 5 and the base member 6. Part of the second vertical supporting body 2, the frame 4 and the bottom piece 5 constitute a supporting member for supporting a prism 8 to be described hereinbelow. These first and second vertical bodies 7, 2 are arranged in a coaxial relationship with each other. The above-described prism 8, which serves as a reflecting mirror, is fixed to a horizontal axis 9 which is rotatably provided on the frame 4. In this arrangement, the prism 8 can swing upwards and downwards about the horizontal axis 9 and can also rotate about the first vertical supporting body 7 via the supporting member. The base member 6 is mounted, for example, on a tripod (not shown). The preamplifier is connected via a coaxial cable 10 to a receiver (not shown). In the figures, numeral 11 denotes a target plate which is divided for discrimination by coloring in yellow and black and is attached by screws 12 to the second vertical supporting axis 2.

FIGS. 3 and 4 show a second embodiment of this invention.

An antenna 1 is fixed to a housing 3 containing therein a preamplifier, which is attached to an upper portion of a frame 13 of square-tube shape. A bottom piece 14 which is fixed to a lower portion of the frame 13 is supported by a second vertical supporting body 7' which is provided on a base member 6 at a connecting portion between the bottom piece 14 and the base member 6 so that the antenna 1 is rotatable about the second vertical supporting body 7'. A first vertical supporting body 15, which is arranged in coaxial arrangement with the second vertical supporting body 7', is rotatably provided on the bottom piece 14, and a U-shaped frame 16 is fixed to an upper end of the first vertical supporting body 15. The bottom piece 14, the first vertical supporting body 15 and the U-shaped frame 16 constitute a supporting member for a prism 8. The prism 8 is fixed to a horizontal support 17 which is rotatably provided on the frame 16. The prism 8 is thus both swingable about the horizontal support 17 and rotatable about the first vertical supporting axis 15.

A target plate 11 is fixed to the U-shaped frame 16.

In the above-described two embodiments, the center of rotation of the prism 8 and an imaginary reflecting surface thereof coincide with each other. In case they are offset, a correction is made to a measured distance value by the amount of the offset.

FIG. 5 shows a third embodiment of this invention.

In this embodiment, a vertical body 18 is used instead of the frame 13 of the second embodiment shown in FIGS. 3, 4. An arm 20 is fixed to a cylindrical body 19 which is fitted coaxially outside the vertical body 18 such that the cylindrical body 19 is rotatable relative to the bottom piece 5. This cylindrical body 19 serves as a first vertical axis. A second vertical axis 7' which includes vertical body 18 is provided on a base member 6 in a coaxial relationship with the first vertical rotating means. The bottom piece 5, the cylindrical body 19 and the arm 20 constitute a supporting member for a prism 8 as described hereinbelow. The prism 8 which is swingable about a horizontal axis 21 and a target plate 11 are provided at an end of the cylindrical body 19. The antenna 1 is thus rotatably supported by the second vertical rotating means 7' via the bottom piece 5 and the vertical body 18.

In this arrangement, if a distance $\overline{OJ}$ to the prism 8 and an angle $\theta_1$ are measured by a total station provided at a point O, the horizontal distance between the point O and the survey point X can be obtained by $\overline{O}\cos\theta_1$ added by a distance d (known value) between the points J and P.

In the above embodiments, it is so arranged that the positions of the antenna and the prism can be immovably fixed with a conventional means such as knobs or the like once their positions have been adjusted after rotation.

In all of the above three embodiments, the prism 8 and the target plate 11 can be displaced or changed in their positions without moving the antenna 1.

Since this invention has the above-described construction, it can be used not only as an antenna apparatus but also as a reflecting mirror for tachymetry. It is therefore possible to measure a distance and angles to a survey point at which the antenna is placed, by means of an EDM, while carring out a GPS interferometer measuring method by receiving radio waves from GPS satellites. It is also possible to carry out tachymetry of the survey point without changing the antenna apparatus for the reflecting mirror apparatus. This invention has, therefore, an advantage in that measuring can be carried out quickly without much time involved.

What is claimed:

1. A reflecting mirror-equipped GPS receiving antenna apparatus comprising:

a reflecting means for reflecting light from and back to a distance and angle measuring means, said reflecting means comprising a reflecting mirror supported by a base member;

means for targeting said reflecting mirror from the distance and angle measuring means, said means for targeting comprising a target disposed around said reflecting mirror;

a microstrip type antenna for receiving radio waves transmitted from GPS satellites, said antenna being supported by said base member above said reflecting mirror;

horizontal pivoting means for pivoting said reflecting mirror relative to said base member about a horizontal axis;

first vertical rotating means for rotating said reflecting mirror about a vertical axis;

second vertical rotating means for rotating said antenna about said vertical axis.

2. A reflecting mirror-equipped GPS receiving antenna apparatus according to claim 1, wherein said reflecting mirror is supported by said base member via a supporting member and wherein said first vertical rotating means is provided on said base member to rotate said reflecting mirror relative to said base member.

3. A reflecting mirror-equipped GPS receiving antenna apparatus according to claim 1, wherein said reflecting mirror is supported by said base member via a supporting member and wherein said supporting member comprises said first vertical rotating means which rotates said reflecting mirror relative to said base member.

4. A reflecting mirror-equipped GPS receiving antenna apparatus according to claim 1, wherein said antenna is rotatably supported at an upper end of said second vertical rotating means whereby said second vertical rotating means rotates said antenna relative to said base member.

5. A reflecting mirror-equipped GPS receiving antenna apparatus according to claim 1, wherein said antenna is rotatably supported by said second vertical rotating means and wherein said second vertical rotating means is provided on said base member to rotate said antenna relative to said base member.

6. A reflecting mirror-equipped GPS receiving antenna apparatus according to claim 1, wherein said second vertical rotating means comprises a substantially cylindrical portion which is surrounded by a substantially cylindrical portion of said first vertical rotating means.

7. A reflecting mirror-equipped GPS receiving antenna apparatus according to claim 1, wherein said antenna is a microstrip type antenna extending substantially parallel to said base member.

8. A reflecting mirror-equipped GPS receiving antenna apparatus according to claim 1, further comprising a housing on which said antenna is mounted, said housing comprising a preamplifier therein.

9. A reflecting mirror-equipped GPS receiving antenna apparatus according to claim 1, wherein said reflecting mirror comprises a prism.

10. A reflecting mirror-equipped GPS receiving antenna apparatus according to claim 1, further comprising attaching means for fixedly attaching said target to said first vertical rotating means.

11. A reflecting mirror-equipped GPS receiving antenna apparatus according to claim 1, further comprising a U-shaped frame fixedly attached to an upper end of said first vertical rotating means.

12. A reflecting mirror-equipped GPS receiving antenna apparatus according to claim 1, wherein said first vertical rotating means comprises a cylindrical body rotatable relative to said base member.

13. A reflecting mirror-equipped GPS receiving antenna apparatus according to claim 12, further comprising an arm having a first end fixedly attached to said cylindrical body and a second end supporting said reflecting mirror.

14. A reflecting mirror-equipped GPS receiving antenna apparatus according to claim 1, wherein said reflecting mirror is rotatable by said first vertical rotating means relative to said antenna and base member.

15. A reflecting mirror-equipped GPS receiving antenna apparatus according to claim 1, wherein said first and second rotating means are concentric and said reflecting mirror and said antenna are rotatable relative to each other.

16. A reflecting mirror-equipped GPS receiving antenna apparatus according to claim 1, wherein said target is colored yellow and black for targeting said reflecting mirror.

* * * * *